United States Patent
Ahmed et al.

(10) Patent No.: US 8,567,133 B2
(45) Date of Patent: Oct. 29, 2013

(54) PHOTOCATALYTIC PANEL AND SYSTEM FOR RECOVERING OUTPUT PRODUCTS THEREOF

(75) Inventors: Osman Ahmed, Hawthorn Woods, IL (US); Maximilian Fleischer, Höhenkirchen (DE); Beate Schlageter, München (DE); Heinrich Zeininger, Obermichelbach (DE)

(73) Assignee: Siemens Aktiengesellschaft, Munich (DE)

( * ) Notice: Subject to any disclaimer, the term of this patent is extended or adjusted under 35 U.S.C. 154(b) by 95 days.

(21) Appl. No.: 13/176,559

(22) Filed: Jul. 5, 2011

(65) Prior Publication Data

US 2013/0008100 A1    Jan. 10, 2013

(51) Int. Cl.
*E04D 13/18* (2006.01)

(52) U.S. Cl.
USPC ........................................... 52/173.3

(58) Field of Classification Search
USPC .............. 52/171.3, 173.3; 502/100, 167, 158, 502/163, 150, 300
See application file for complete search history.

(56) References Cited

U.S. PATENT DOCUMENTS

| | | | |
|---|---|---|---|
| 4,051,999 A | | 10/1977 | Granger et al. |
| 4,806,514 A | * | 2/1989 | Langford et al. .............. 502/159 |
| 5,755,867 A | * | 5/1998 | Chikuni et al. .......... 106/287.16 |
| 6,013,372 A | * | 1/2000 | Hayakawa et al. ........ 428/411.1 |
| 6,090,489 A | * | 7/2000 | Hayakawa et al. ........... 428/409 |
| 6,165,256 A | * | 12/2000 | Hayakawa et al. .............. 106/13 |
| 6,387,844 B1 | | 5/2002 | Fujishima et al. |
| 6,680,578 B2 | | 1/2004 | Antoniadis et al. |
| 7,749,621 B2 | | 7/2010 | Greenberg et al. |
| 7,834,546 B2 | | 11/2010 | Krummacher et al. |
| 8,313,634 B2 | * | 11/2012 | Bocarsly et al. .............. 205/440 |
| 2003/0154973 A1 | | 8/2003 | Nyhart et al. |
| 2003/0177705 A1 | | 9/2003 | Forbis et al. |
| 2007/0199560 A1 | | 8/2007 | Hobbs et al. |
| 2007/0232486 A1 | * | 10/2007 | Aso et al. ....................... 502/208 |
| 2009/0061267 A1 | * | 3/2009 | Monzyk et al. ................. 429/21 |
| 2009/0220388 A1 | * | 9/2009 | Monzyk et al. ................ 422/121 |
| 2010/0180889 A1 | * | 7/2010 | Monzyk et al. .......... 128/202.26 |
| 2011/0053285 A1 | * | 3/2011 | Jeon et al. ..................... 436/164 |
| 2011/0129204 A1 | * | 6/2011 | Lee et al. ...................... 392/438 |

FOREIGN PATENT DOCUMENTS

DE    102006016333 A1    10/2007

\* cited by examiner

*Primary Examiner* — Mark Wendell

(57) ABSTRACT

A system and method is provided for using sunlight to convert an atmospheric gas to an output product and capture that output product. A photocatalytic element is encapsulated within a chamber in which the chamber is light transmissive, and is substantially permeable to the atmospheric gas and substantially impermeable to the output product. The photocatalytic element may be composed of a photocatalytic composition, comprising a first constituent capable of capturing or binding an atmospheric gas, a second constituent capable of reducing the atmospheric gas using energy from the sunlight, and a third constituent adapted to absorb sunlight, all combined into a single polymer. A fourth constituent may be added that is hydrophobic or hydrophilic depending upon the nature of the other three combined constituents.

40 Claims, 7 Drawing Sheets

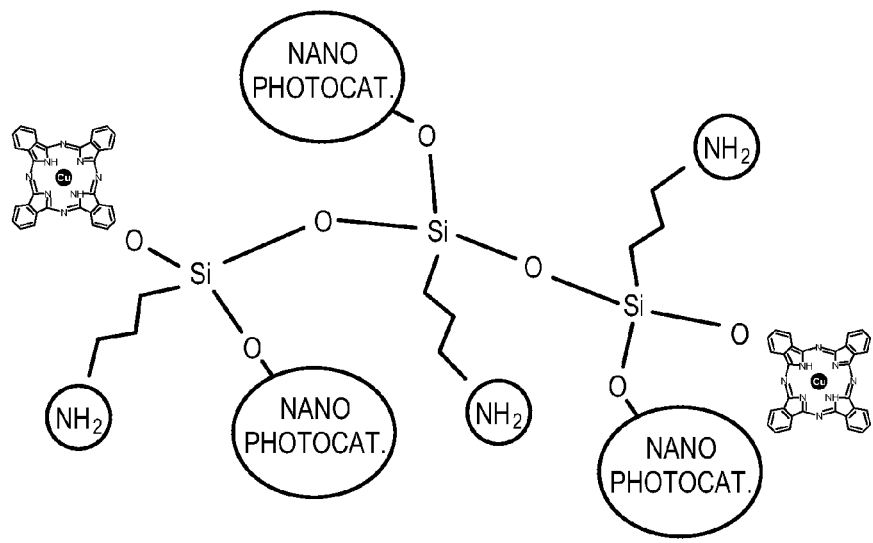
FIG. 10
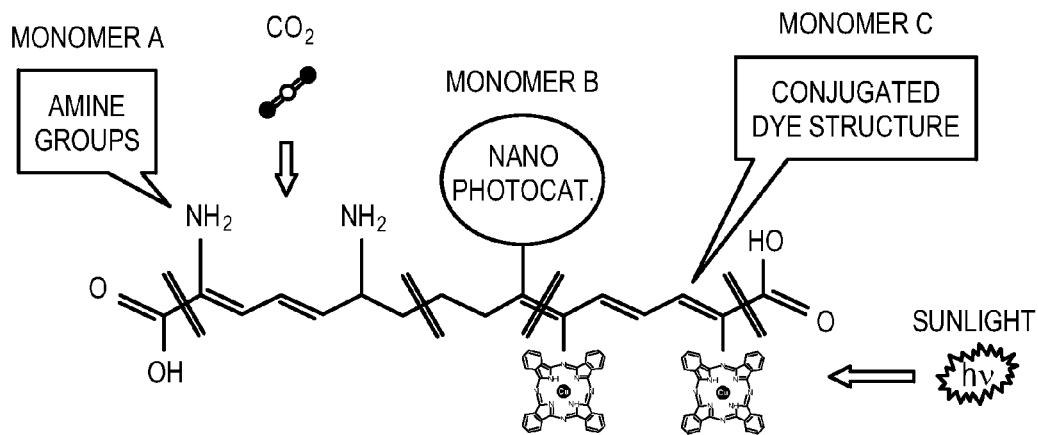
FIG. 11
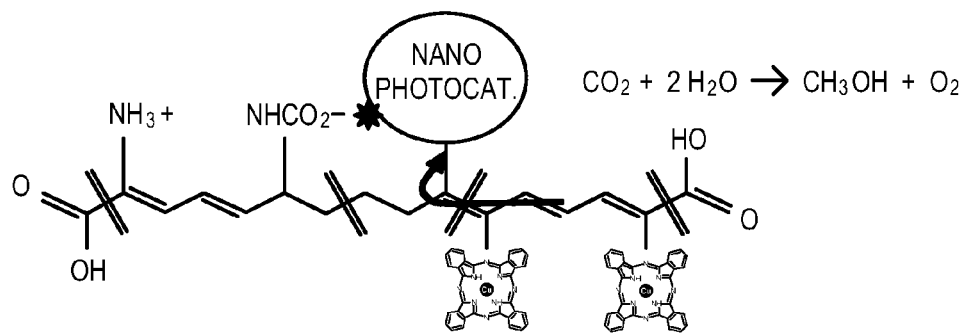

US 8,567,133 B2

PHOTOCATALYTIC PANEL AND SYSTEM FOR RECOVERING OUTPUT PRODUCTS THEREOF

CROSS-REFERENCE TO RELATED APPLICATIONS

This application is related to commonly-assigned co-pending application Ser. No. 13/176,523, filed on Jul. 5, 2011, titled "Photocatalytic Panel and System for Recovering Output Products Thereof", and to commonly-assigned co-pending application Ser. No. 13/176,582, filed on Jul. 5, 2011, titled "Environmentally Responsive Building and Control System Therefor." The entire disclosure of each of these two applications is incorporated herein by reference to the extent permitted by law.

FIELD OF THE INVENTION

The embodiments disclosed herein relate to devices and methods for using sunlight and atmospheric gases to generate useful output products. In particular, the embodiments incorporate elements for achieving photocatalysis or photosynthesis into panels, along with systems for extracting and storing the output products.

BACKGROUND

The concern over greenhouse gases and their effect on the atmosphere and global ecosystem has grown over the last decade. Greater awareness of the effect of certain gases, such as carbon dioxide ($CO_2$), has prompted efforts to reduce carbon emissions. As a result, many regulated industries incorporate local systems for scrubbing emissions to reduce the amount of $CO_2$ and other greenhouse gases discharged into the atmosphere. Fossil fuel powered vehicles include catalytic converters to reduce harmful exhaust emissions.

However, cost and performance concerns have hampered compliance or even acceptance of systems to reduce greenhouse gas emissions, especially in growing industrial economies. In some cases the greenhouse gases can be recycled and re-used in combustion. However, many of the current approaches to minimizing greenhouse gas emissions simply convert the harmful component of the gases into an output that can be disposed of in a landfill.

As concern over greenhouse gases, and especially $CO_2$, increases alternative solutions become more critical, particularly solutions that do not require government-mandated and regulated compliance. An optimal solution would be to reduce greenhouse gases while generating a useful product that does not require some other form of disposal.

SUMMARY

In one aspect, a photocatalytic panel is provided comprising a housing having a plurality of walls defining a chamber and an outlet in communication with the chamber. At least one wall of the housing has a portion that is transmissive to sunlight. A photo-conversion element is disposed within the chamber for exposure to sunlight through the transmissive portion. The photo-conversion element is operable to use sunlight to convert an atmospheric gas into an output product dischargeable through the outlet. At least one of the plurality of walls includes a permeable portion having a high permeability to the atmospheric gas and a low permeability to the output product.

In a further aspect, a photocatalytic composition is provided that comprises a first constituent or composition (A) capable of capturing or binding an atmospheric gas, a second constituent or composition (B) capable of reducing the atmospheric gas using energy from the sunlight, and a third constituent or composition (C) adapted to absorb sunlight. The constituents may be monomers that are combined in a suitable manner to form a single polymer. In one feature, the monomers are combined in a repeating chain with spacing between adjacent monomers on the nanometer scale. The repeating chain may be configured so that the monomer capable of reducing the atmospheric gas (monomer B) is immediately adjacent both the supply of atmospheric gas, namely monomer A, and the source of energy, namely monomer C. The photocatalytic composition may further include a fourth constituent that is hydrophobic or hydrophilic depending upon the hydrophilic/hydrophobic nature of the other constituents.

DESCRIPTION OF THE FIGURES

FIG. 3b is an enlarged perspective view of a component of the photocatalytic panel shown in FIG. 3a.

FIGS. 10 and 11 are diagrams of the chemical structure of a polymer for use in the photocatalytic elements disclosed herein.

DETAILED DESCRIPTION

Figure 1:
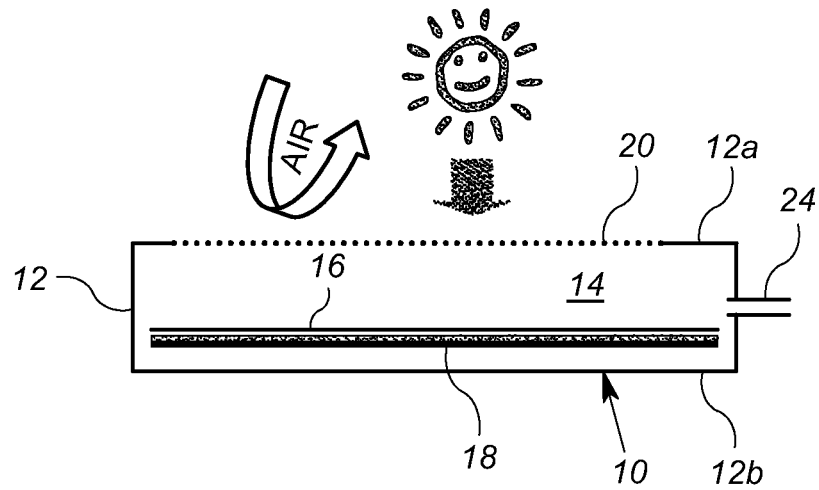
FIG. 1 is a cross-sectional representation of a photocatalytic panel according to one disclosed embodiment.

Referring to FIG. 1, a photocatalytic panel 10 is provided that includes a housing 12 defining a chamber 14. The housing 12 may be configured for the panel 10 to serve as a building panel. The housing may thus have sufficient structural integrity to act as the "skin" of the building. Alternatively, the housing of the panel 10 may be configured as a "stand-alone" element. The chamber 14 is preferably substantially sealed or encapsulated to avoid the loss of gas of volatile products within the chamber.

A photo-conversion element 16 is disposed within the chamber 14, in which the conversion element is operable to convert sunlight and atmospheric gas(es) into an output product. The photo-conversion element may include a composition capable of achieving photosynthesis or "artificial photosynthesis" in which air, water and sunlight are processed to produce an output product, much like a biological plant. In another form, the photo-conversion element 16 is a photocatalytic panel operable when "powered" by sunlight to react with carbon dioxide ($CO_2$) in the presence of water to produce an output product such as methanol, carbon monoxide or certain hydrocarbons. In one example, this reaction can be accomplished with a photocatalytic element containing titanium dioxide ($TiO_2$) nanoparticles. The $TiO_2$ nanoparticles may be augmented with carbon nanotubes or other metallic nanoparticles to improve the reaction efficiency. For the purposes of the present disclosure, the photo-conversion element will be referred to as a photocatalytic element 16, with the understanding that the element may operate by "artificial photosynthesis" to produce different output products.

The photocatalytic element 16 may be supported on a generally rigid substrate 18 capable of supporting the photocatalytic element within the chamber 14. The substrate may be formed of a sufficiently rigid material that may be inert to the reaction components and reaction products of the photocatalytic or photosynthesis reaction. In certain embodiments, the substrate and the housing may be formed of the same material, which may be a metal, polymer, glass or even a ceramic. The photocatalytic element may be associated with the substrate in any manner, such as by applying the photocatalytic element as a layer on the substrate or by affixing a separately formed photocatalytic sheet on the substrate.

At least one of the walls 12a of the housing is configured to allow sunlight to pass through and onto the photocatalytic element. The wall 12a is thus provided with a portion that is light transmissive, or more particularly transmissive to light wavelengths favorable to the photosynthesis reaction. The wall 12a may further include a portion that is permeable to an atmospheric gas or gases that are necessary for the photosynthesis reaction. For instance, the portion of the wall may be highly permeable to $CO_2$. Moreover the wall portion is impermeable or has a low permeability for reaction products of the photosynthesis reaction. Thus, in embodiments in which the reaction product is methanol, the portion of wall 12a is generally impermeable to methanol so that this output product will not leak from the chamber 14.

In one embodiment, the wall 12a is provided with a membrane 20 spanning all or a portion of the wall, as depicted in FIG. 1. The membrane is formed of a material that is permeable to atmospheric gas, such as $CO_2$, impermeable to the reaction product, such as methanol, and light transmissive. In certain embodiments the membrane maybe formed of polysiloxane, polyamine, polyphenylene-oxide, cellulose-acetate, ethylcellulose, polyethylene, polypropylene, polybutadiene, polyisoprene, polystyrol, polyvinyl, polyester, polyimide, polyamide, polycarbonate, or other similar polymeric materials.

Figure 2:
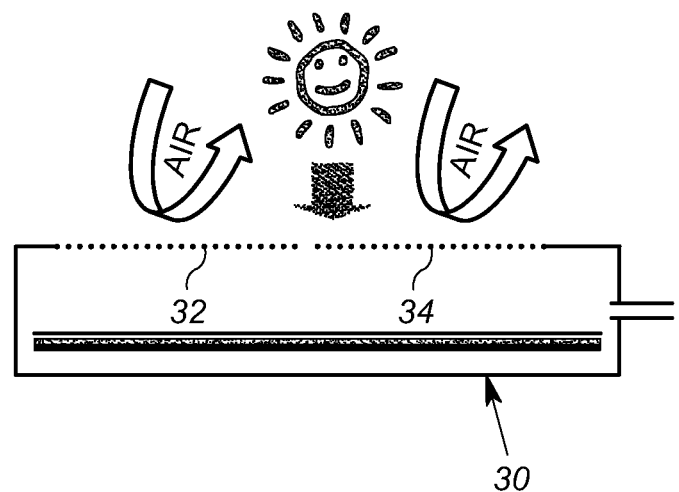
FIG. 2 is a cross-sectional representation of a photocatalytic panel according to a second disclosed embodiment.

Certain photocatalytic and photosynthesis reactions require water, so the photocatalytic panel 10 is configured to direct water to the photocatalytic element 16. In one embodiment, the housing 12 includes a portion that is configured for passage of atmospheric moisture into the chamber 14. Thus, the membrane 20 may also be permeable to atmospheric moisture. Alternatively, a photocatalytic panel 30 may be provided that includes one portion 32 that is permeable to the atmospheric gas and another portion 34 that is permeable to atmospheric moisture, as illustrated in FIG. 2. Each portion may thus incorporate a membrane having the requisite permeability, as well as an impermeability or low permeability for the photosynthesis output product(s).

The substrate 18 is formed of a material that is essentially inert to the photocatalytic element 16 and to the photosynthesis process. The material is sufficiently strong to support the photocatalytic element within the chamber, while maintaining a thin profile. In some embodiments, the photocatalytic element 16 is transparent or translucent. In these embodiments, the substrate 18 may incorporate a reflective surface onto which the photocatalytic element is disposed. The reflective surface will reflect any sunlight that passes through the layer 16 back into the layer to feed the photosynthesis reaction.

The housing 12 is provided with an outlet 24 for discharge of the photosynthesis output product(s). In certain embodiments the output product(s) are primarily gaseous, such as methanol, CO or certain hydrocarbons. The outlet 24 may thus be positioned in a variety of locations on the housing. It may be contemplated that a flow impeller, such as an exhaust fan, may be integrated into the outlet to ensure that the photosynthesis output product(s) will exit the chamber 14. Alternatively, the outlet 24 may open to a low pressure chamber to induce gas flow across the outlet. In addition, it is contemplated that the outlet 24 includes a filter that is permeable to the output product(s) but substantially impermeable to the photosynthesis gas, such as $CO_2$, as well as to water or moisture within the chamber. In some photosynthesis processes, the output product(s) may include a liquid, with the outlet 24 being appropriately positioned and configured for discharge of the liquid output product(s).

Figure 3A:
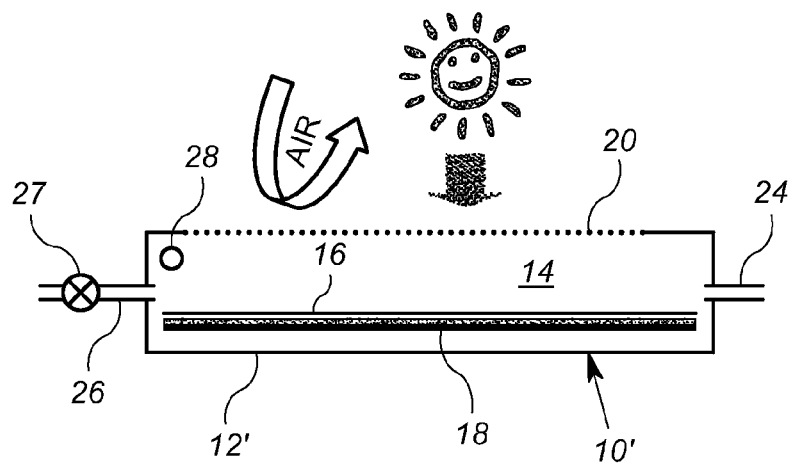
FIG. 3a is a cross-sectional representation of a photocatalytic panel according to a third disclosed embodiment.
Figure 3B:
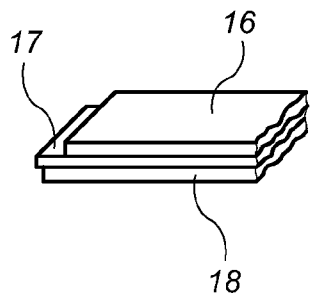

The photocatalytic panel 10 shown in FIG. 1 may be modified to accept water from an external supply. Thus, the photocatalytic panel 10' shown in FIG. 3a may include a water inlet 26 in the housing 12', in which the inlet is connected to a water source, such as a building water supply. The water may be provided directly from the inlet 26 to the photocatalytic element 16. The panel may be configured to distribute the water across the panel to optimize the photosynthesis reaction on the panel. Thus, the panel may be configured with water distribution channels. In one embodiment, the photocatalytic element 16 is provided with a capillary sheet 17 disposed between the panel and the substrate 18. This capillary sheet is configured to transport water by capillary action throughout the entire photocatalytic element. The inlet 26 may incorporate a valve 27 between the inlet and the water source to control the flow of water into the photocatalytic panel 10'. A water sensor 28 may be provided inside the chamber 14 or in contact with the photocatalytic element 16 to evaluate the water level of the element. The sensor may be a humidity sensor or a moisture sensor that is linked to the valve 27 to control the flow of water into the photocatalytic panel. Alternatively, the inlet 26 may provide water to a reservoir with the capillary sheet 17 in direct contact with the reservoir. The sheet will draw water from the reservoir as needed by capillary action. The reservoir can be configured to be replenished when the water in the reservoir drops below a predetermined level.

Figure 4:
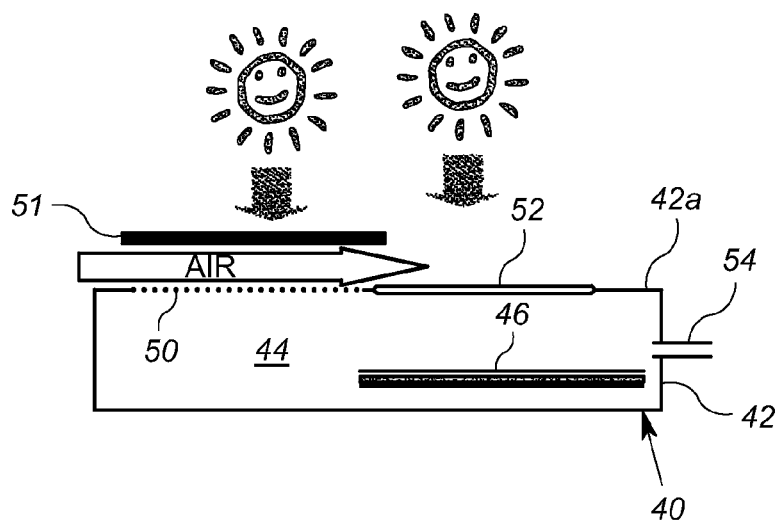
FIG. 4 is a cross-sectional representation of a photocatalytic panel according to a fourth disclosed embodiment.

In another embodiment, a photocatalytic panel 40 may be configured to control the sunlight exposure for photocatalytic element, as depicted in FIG. 4. For certain photocatalytic elements, the compositions may degrade over time when exposed to sunlight. It is therefore desirable to limit this exposure to thereby improve the longevity of the photocatalytic element. In this embodiment, the photocatalytic panel 40 includes a housing 42 defining a chamber 44. The photocatalytic element 46 is disposed within the chamber but in this embodiment is sized to span only a portion of the dimension of the housing. More particularly, the photocatalytic panel 40 is provided with a gas permeable membrane 50, like the membranes discussed above, and an optical window 52 in direct alignment with the photocatalytic element 46. The element 46 and window 52 may be generally coextensive. The photocatalytic panel 40 further includes a shield 51 that is arranged to slide across the wall 42a of the housing. The shield 51 may thus variably block the optical window 52 to control the amount of sunlight passing to the photocatalytic element. The movement of the shield may be controlled in relation to the output of the photocatalytic element 46 and/or the availability of reactive atmospheric gas (such as $CO_2$) within the chamber 44. For instance, if the $CO_2$ level within the chamber is too low to sustain a significant photosynthetic or photocatalytic reaction, there is no need to provide sunlight to the photocatalytic element. In this instance, the shield 51 may be positioned to completely block sunlight to the photocatalytic element. As the $CO_2$ level increases the shield can be moved to gradually open the optical window and expose the photocatalytic element to sunlight.

Figure 5:
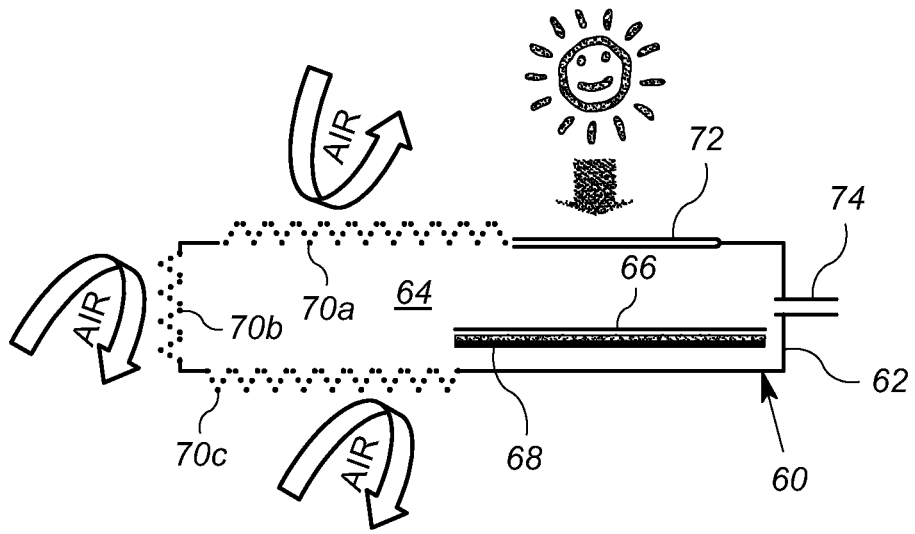
FIG. 5 is a cross-sectional representation of a photocatalytic panel according to a fifth disclosed embodiment.

In most cases, the amount of sunlight available for a photosynthesis or photocatalytic reaction exceeds the $CO_2$ available to sustain the reaction, at least within the controlled, sealed environment of the photocatalytic panels disclosed herein. Consequently, the photocatalytic panel 40 may be modified to increase the ability of the panel to accept $CO_2$ from the atmosphere. As shown in FIG. 5, a photocatalytic panel 60 may be configured similar to the panel 40, with an optical window 72 aligned and generally coextensive with a photocatalytic element 66 mounted on a substrate 68 within the chamber 64. A portion of the housing 62 may be configured to support multiple membranes 70a, 70b and 70c that are permeable to $CO_2$. More membrane surface area means more $CO_2$ passing from the atmosphere into the chamber 64. This surface area may be further increased by incorporating folds into the membranes, as illustrated in FIG. 5. This "accordion" or corrugated configuration significantly increases the surface area of each membrane 70a, 70b and 70c. In some applications a single membrane with this accordion feature may be sufficient for optimal photosynthetic or photocatalytic reaction within the building panel.

In the embodiments of FIGS. 1-5, the photocatalytic element is supported on a substrate that is mounted within the encapsulated or sealed chamber. Brackets (not shown) may be used to mount the substrate (such as substrate 18) to the interior of the housing (such as housing 12). In order to replace a spent photocatalytic element, the housing may be configured to permit removal of the layer and substrate. In one approach, a wall is configured to be removed from the housing to provide access to the photocatalytic element. In another approach, an opening or slot may be provided in a wall of the housing so that the layer and substrate can slide into and out of the chamber. Other methods and means for removably supporting the photocatalytic element within the sealed chamber are contemplated.

Figure 6:
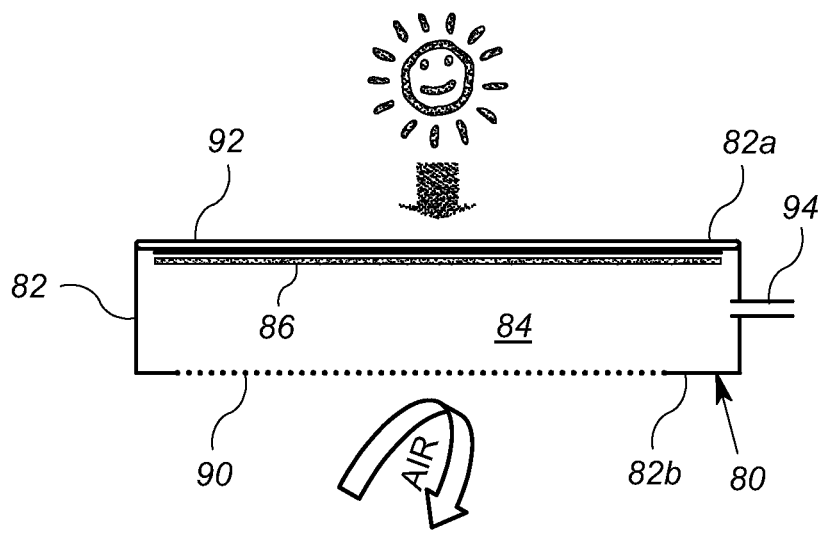
FIG. 6 is a cross-sectional representation of a photocatalytic panel according to a sixth disclosed embodiment.

In certain embodiments, the separate substrate may be eliminated by mounting the photocatalytic element directly to a wall of the photocatalytic panel. Thus, as shown in FIG. 6, a photocatalytic panel 80 includes a housing 82 defining a sealed chamber 84 having an outlet 94 for the photosynthesis/photocatalysis output products. An exterior wall 82a of the housing may be provided with an optical window 92 configured to be transmissive to sunlight or more particularly to light of a wavelength effective for the photosynthesis or photocatalysis reaction. In this embodiment, the photocatalytic element 86 is mounted directly to the optical window 92. An opposite wall 82b of the housing may include a membrane 90 or other feature that is permeable to reaction gases, such as $CO_2$. The membrane may also be permeable to moisture, as described above, or the photocatalytic panel 80 may be configured to integrate with an external source of water necessary to conduct the photosynthesis/photocatalysis reaction.

In the embodiments of FIGS. 1-6, the encapsulated photocatalytic panel is gas filled with a gaseous output product. During a photosynthesis/photocatalysis reaction the chamber (such as chamber 14) will be filled with $CO_2$ allowed to pass through the membrane 20 and a gaseous output product such as methanol.

Alternatively, the photocatalytic reaction may occur in a liquid environment with the output product dissolved in the liquid for discharge. A photocatalytic panel 100 shown in FIG. 7 includes a housing 102 defining an encapsulated or sealed chamber 104. A photocatalytic element 106 is supported on a substrate 108 disposed within the chamber. One wall 102a of the housing is provided with an element 110 that is permeable to gases for sustaining a photocatalytic reaction, such as $CO_2$, and light transmissive. It is understood that the element may be a membrane with these properties or may be two elements supporting the two properties separately.

Figure 7:
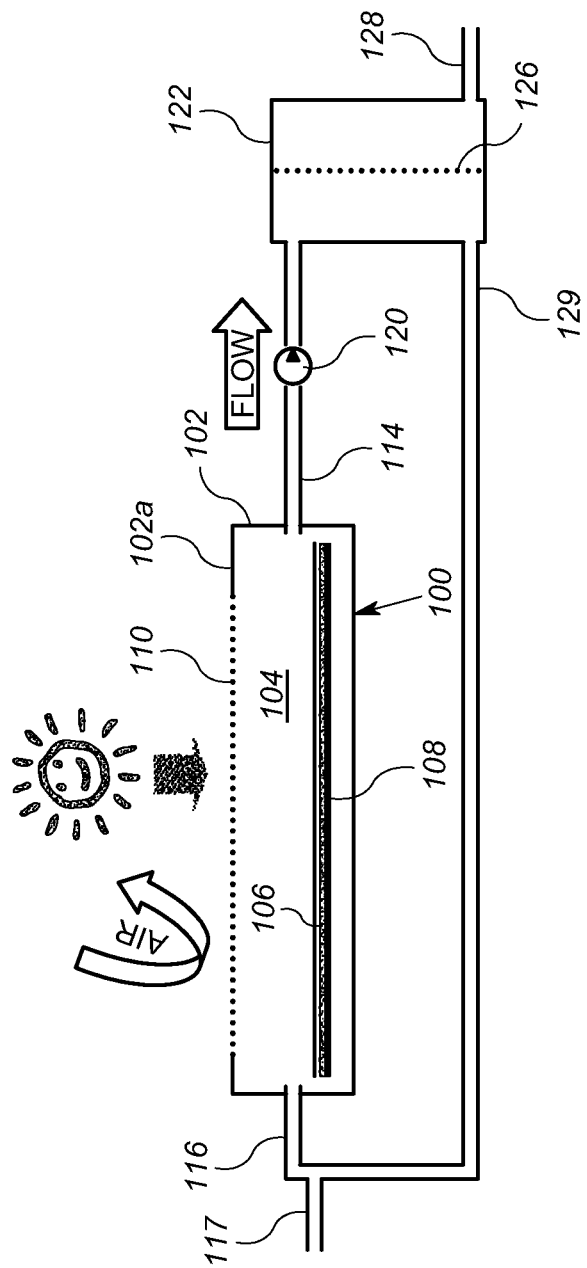
FIG. 7 is a cross-sectional representation of a photocatalytic panel and output product recovery system according to one disclosed embodiment.

In this embodiment, the housing 102 is configured to contain a liquid, preferably a water-based solution useful for supporting a photocatalytic or photosynthesis reaction in the element 106. Moreover, the liquid is preferably miscible with the output products of the photocatalytic/photosynthesis reaction. The liquid, such as water or a buffered water solution, is provided to the chamber 104 through inlet 116 and discharged via outlet 114. A pump 120 may be provided at the outlet, as shown in FIG. 7, or at the inlet to provide a continuous flow of liquid through the photocatalytic panel 100. The liquid is intimate contact with the portion of the element 110 that is permeable to the reaction gas, such as $CO_2$, so that the gas can dissolve in the liquid. In one embodiment the liquid is water which is useful to support the photocatalytic or photosynthesis reaction and which is known to readily dissolve $CO_2$. Water is also known to dissolve certain photocatalytic output products, such as methanol. The liquid flowing through the photocatalytic panel 100 may also physically transport other reaction products that may not dissolve in the liquid.

The outlet 114 of the photocatalytic panel 100 feeds to a separator chamber 122 that is operable to separate and pass the reaction products while recycling the liquid or water. The chamber 122 may thus include a separation element or membrane 126 that is configured to permit passage of the reaction products while remaining substantially impermeable to the liquid, such as water. The separated output product is discharged from the separation chamber 122 through outlet 128 for storage or transport.

The chamber 122 is connected to a recycle conduit 129 that returns the liquid/water back to the inlet 116. Since a certain amount of the liquid/water is necessarily consumed during the photocatalytic/photosynthesis reaction, a refill inlet 117 is provided at the inlet 116. The refill inlet is connected to a liquid/water supply and may be regulated with a control valve configured to ensure that the chamber 104 of the building panel 100 is filled but not over-pressurized.

Figure 8:
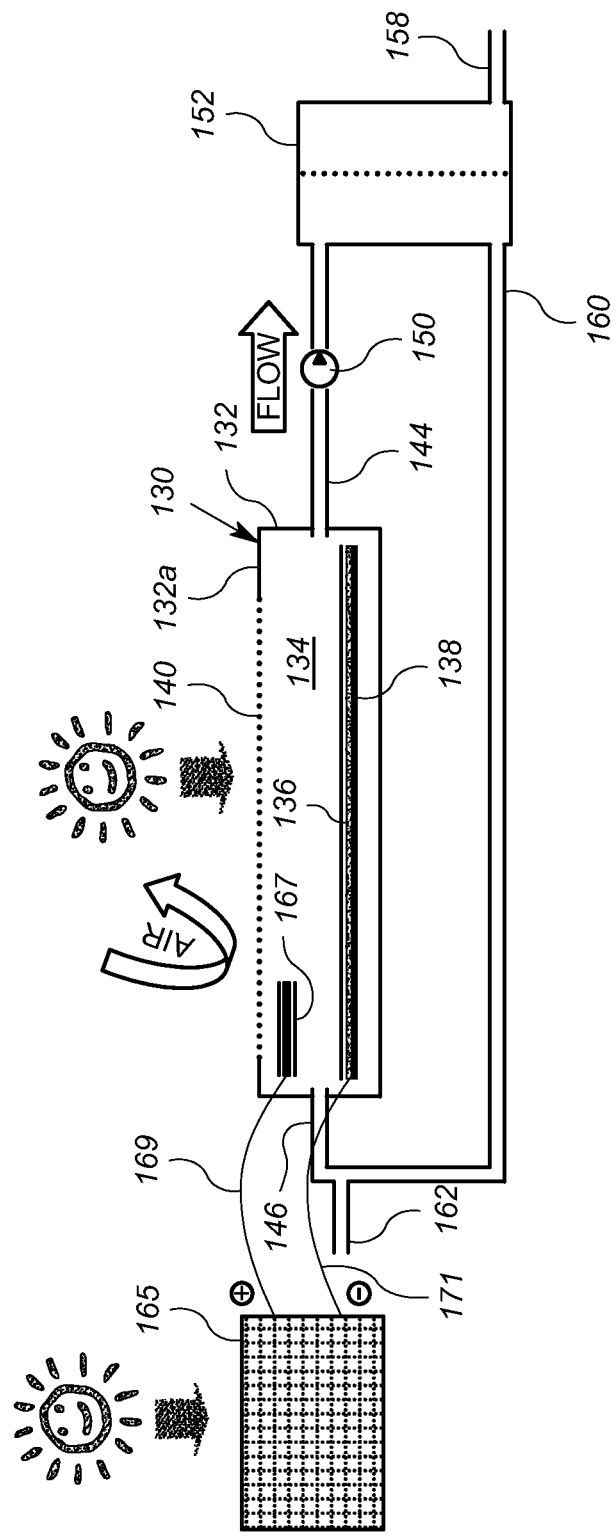
FIG. 8 is a cross-sectional representation of a photocatalytic panel and output product recovery system according to another disclosed embodiment.

In another embodiment, a photocatalytic panel 130 shown in FIG. 8 includes a photocatalytic element 136 that is configured for enhanced catalytic reaction by the application of a voltage to the element. The photocatalytic element 136 is mounted on a substrate 138 that includes an electrically conductive portion. The building panel 130 includes a housing 132 defining a chamber 134 within which the photocatalytic element is supported. A wall 132a of the housing incorporates an element 140 that is permeable to $CO_2$ but impermeable to the photocatalylitic or photosynthetic output products and to a liquid, such as water, filling the chamber. As in the embodiment shown in FIG. 7, the housing defines an outlet 144 that may incorporate a control valve 150 to direct flow of water laden with the reaction output product to a separator 152. The separator 152 has an outlet 158 for the separated output product and is connected to a recycle conduit 160 that returns the liquid/water to the inlet 146 to the chamber 134. Additional water is provided through a refill inlet 162.

In a further aspect, the photocatalytic panel 130 shown in FIG. 8 includes means for applying a voltage to the photocatalytic element 136. Thus, an electrode or electrode plate 167 is disposed within the chamber 134 offset from the photocatalytic element 134 and substrate 138, with a conducting liquid, such as water, disposed within the gap. The electrode plate 167 and conductive portion of the element 136 and/or substrate 138 are connected to a voltage source 165 by respective electrical wires 169, 171. In one aspect, the voltage source may be a photovoltaic converter exposed to sunlight so that the photocatalytic panel does not need to be connected to an external power source. The photovoltaic converter 165 may be sized to provide power to other components of the photocatalytic panel, such as the valve 150. In one specific embodiment it may be envisioned that the voltage course generates voltage in the range of 1-3V.

The photovoltaic converter 165 may be further sized to complement the capacity of the photocatalytic element 136. Both elements (the converter and photocatalytic element) rely upon sunlight for energy input. An increase in the intensity of the sunlight increases the amount of catalytic or photosynthetic reaction in the element 136. This increased reaction requires more electrical energy. As the sunlight intensity increases the output of the photovoltaic converter increases. The increased capacity/output of the photocatalytic element and photovoltaic converter can be coordinated to optimize the amount of output product generated by the photocatalytic panel.

It is known that many photocatalytic or photosynthetic materials can degrade under constant exposure to sunlight. Moreover, certain materials are susceptible to specific wavelengths in the sunlight that are not essential to support the photocatalytic or photosynthetic reaction. The photocatalytic panels disclosed herein may be configured with various filters to limit exposure of the photocatalytic elements to harmful wavelengths in the sunlight. The filter may be associated directly with the photocatalytic element or may be associated with the light transmissive portions of the housing wall.

The photocatalytic panels disclosed herein may be associated with a building or may be free-standing such as part of a solar power facility. The panels may be mounted on a building surface or may be configured to replace a non-load bearing building panel, such as a window. In the latter case, the photocatalytic panel preferably includes opposite housing walls that are light transmissive. For instance, in the photocatalytic panel 10 shown in FIG. 1, the wall 12a may include a portion that is light transmissive, which may be the $CO_2$ permeable membrane 20. The opposite wall 12b may also be formed of a light transmissive material, such as the optical window shown in FIG. 4. The photocatalytic element, such as element 16 and supporting substrate 18, may be sized to provide a clear optical path through a portion of the building panel 10.

Figure 9:
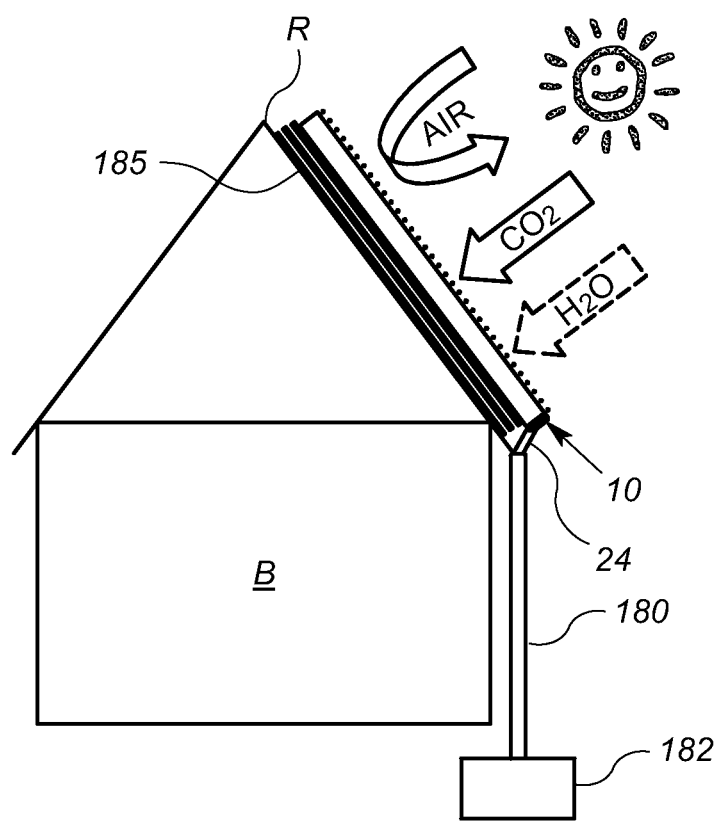
FIG. 9 is a cross-sectional representation of a photocatalytic panel and output product recovery system employed on a building according to a further disclosed embodiment.

In one example shown in FIG. 9, a photocatalytic panel, such as panel 10, is mounted on a roof surface R of a building B with the panel arranged for optimum sun exposure. It is also contemplated that any photovoltaic element, such as the converter 165 shown in FIG. 8, could also be mounted on the same building surface in proximity to the photocatalytic panel 10.

The photocatalytic panel may be part of a system for harvesting the output product of the photocatalytic or photosynthetic reaction. Thus, the outlet of the photocatalytic panel, such as outlet 24, may be connected by a conduit 180 to a storage tank 182. The nature of the conduit and tank may depend upon the nature of the output product, whether a gas or a liquid. In may be contemplated that the continuous generation of output product in the photocatalytic panel will result in an increased pressure within the photocatalytic panel that will automatically drive the output product from the photocatalytic panel down the conduit 180 to the storage tank 182. Gravity may also assist in conveying the output product to the storage tank, especially for a liquid output product. A gaseous output product may require a regulated pump (not shown) to help draw the gas from the building panel and convey it to the storage tank 182. Moreover, a pressure relief valve may be provided to prevent excessive and potentially damaging gas pressure within the building panel. The photocatalytic panel or conduit 180 may be provided with a pressure sensor capable of sensing the pressure within the building panel. If the internal pressure exceeds a threshold value, the sensor may activate components to stop or slow the catalytic/photosynthetic reaction. This may include moving a shield, such as shield 51 in FIG. 4, to block sunlight, or may include controlling the water supply to the photocatalytic panel, such as by controlling the valve 27 shown in FIG. 3a. Alternatively, or in addition, a temperature sensor may be provided within the chamber to control the system components in response to excessive temperature within the photocatalytic panel. In the case of the water-filled chamber, such as in the embodiment shown in FIG. 7, the temperature sensor can be used to temporarily increase the flow of water through the photocatalytic panel so that the ambient temperature water can carry heat out of the panel.

In a further aspect, the output product may be thermally driven from the photocatalytic panel to the storage tank. For example, it is known that methanol tends to readily evaporate in warm spaces and condense in cooler locations. Thus, in order to facilitate the flow of methanol from the building panel to the storage tank, the photocatalytic panel 10 is maintained at an elevated temperature. A thermal isolation layer 185 may be provided between the panel and the roof surface R to reduce heat transfer to the building. The photocatalytic panel may be warmed naturally from the solar energy and capable of maintaining a temperature above the boiling point of methanol (about 65° C.). At the same time, the storage tank 182 is maintained at a much lower temperature to induce heat convection from the photocatalytic panel to the tank.

In order to maintain the storage tank at a lower temperature regardless of ambient outdoor conditions, the tank 182 may be buried underground. Underground storage can maintain a generally uniform temperature of about 12° C. so that the resulting 50° C. temperature difference between building panel and storage tank will ensure a consistent flow of output product to the tank. Temperature and pressure sensors associated with the storage tank 182 can be used to trigger certain actions, such as bleeding off pressure within the tank, applying cooling, or even controlling the building panel to slow or stop the generation of output product.

The storage tank 182 may be associated with a single photocatalytic panel or a plurality of panels. The number of building panels served by a given storage tank can be determined by the output rate of the photocatalytic panels, the storage capacity of the tank, and the ability to sustain the thermal driving of the output products to the storage tank. Moreover, the storage tank(s) may be part of a larger system in which the contents of the tank(s) are pumped to a larger storage, processing or distribution system, much like a natural gas extraction system.

The photocatalytic panels and systems disclosed herein are well suited for removing carbon dioxide ($CO_2$) from the atmosphere. On a large scale, widespread use of these building panels can help reduce the problem of $CO_2$ as a greenhouse gas. The building panels can be particularly concentrated around regions known to generate $CO_2$ emissions, such as in urban settings where vehicle emissions are prevalent and untreated. Not only do the photocatalytic panels disclosed herein help reduce the $CO_2$ content in the local atmosphere, they also convert that $CO_2$ into output products that have other utility, such as methanol.

The photocatalytic elements used with the photocatalytic panels disclosed herein may be of various known configurations, and of various known configurations for photocatalytic reduction of $CO_2$. For instance, suitable photocatalytic elements may incorporate one or more of the following materials: porous graphitic carbon nitrides or carbamates to split $CO_2$ into $CO$ and $O_2$; ruthenium-rhenium based catalysts with triethylamin as a reducing agent operable for light at wavelengths less than 500 nm; Ru(2,2')-bipyridine-2 with water to reduce the $CO_2$ to $CO$ and $H_2$; $ZrO_2$ with UV radiation to form $CO$ and $H_2$; and $TiO_2$ with water to reduce the $CO_2$ to methane ($CH_4$) and methanol ($CH_3OH$). Most of these prior approaches are inefficient and only produce meaningful output products with high concentrations of $CO_2$, often concentrations well above the normal atmospheric levels. In some instances, it may be necessary to provide some means to enhance exposure of the photocatalytic element(s) to $CO_2$.

In another aspect of the present disclosure, a photocatalyst or photocatalytic composition is presented that incorporates three functions necessary for $CO_2$ reduction, namely: i) $CO_2$ enrichment and activation; ii) effective absorption of sunlight; and iii) using energy from the sunlight to reduce the acquired $CO_2$. With respect to the first function, it can be appreciated that the chemical reaction occurring in the photocatalyst will yield a satisfying rate of production of output product only if a sufficient concentration of $CO_2$ is available. Certain chemical species are known to bind or capture $CO_2$ at or near ambient temperature. However, the binding of the $CO_2$ must not be too strong to prevent release of the $CO_2$ for use in the catalytic reaction. In accordance with one aspect, a photocatalytic element for use in the building panels disclosed herein includes a composition or constituent capable of binding, capturing or adsorbing $CO_2$ from the air. The composition may include an amine group provided in a liquid or solid state depending upon the desired environment for the $CO_2$ capture, and capable or reversibly binding $CO_2$. In a solid state, the amine group may include the chemical group of polysiloxanes, or graphitic carbonitrides ($C_3N_4$) with a terminating amine group. Alternatively, the composition may include a carbonate capable of binding $CO_2$ via reversible reaction to the bicarbonate state.

The second function, namely absorbing sunlight, is accomplished by a composition or constituent adapted to absorb sunlight, or more specifically certain wavelengths of light suitable for fueling the catalytic or photosynthesis reaction. Thus, strongly light absorbing groups or dyes are utilized that are stable even under strong direct sunlight. Suitable dyes may include: natural dyes, such as anthocyanine, anthochinone and carotinoide dyes; and synthetic dyes, such as polymethin, azo, triphenylmethan, antrachinone, alizarine, porphine or phthalocyanine dyes.

The third function of using the light energy to reduce the $CO_2$ may be accomplished with compositions useful for efficient light absorption, such as catalytic metals supported on oxides, such as $ZrO_2$, $SiO_2$, $Al_2O_3$ and $TiO_2$. Other suitable compositions may include other catalytic metals, such as Pt, Pd, Ru, Re, Fe and Co. These "reaction centers" may be embodied as a nano-catalyst for improved efficiency.

In accordance with one feature of the disclosed embodiments, each of the three functions is accomplished through a combination of the three compositions or constituents. In the combination it is important that the constituent performing the reduction of $CO_2$ be in very close proximity to the constituent that traps the ambient $CO_2$, and in very close proximity to the constituent that traps the light energy. Preferably, the constituents are combined in a nanometer scale so that the gap between constituents is no more than a few nanometers to ensure rapid and complete communication of $CO_2$ and energy. In addition, at least the composition absorbing sunlight and the composition for reducing the atmospheric gas ($CO_2$) are combined to permit electron energy transport between the compositions. This energy transport thus permits the efficient transfer of the energy from the sunlight captured by the sunlight absorbing composition to the "reaction center" compositions that use this energy to reduce the atmospheric gas.

In one embodiment, the three constituents are monomers that are combined into a single polymer. Thus, the polymer is formed from a first constituent or monomer A suitable for enhanced $CO_2$ adsorption, a second constituent or monomer B adapted to perform the photocatalytic function, and a third constituent or monomer C in the form of an efficient light absorbing dye adapted to perform the photocatalytic function. The photocatalytic element thus includes a layer of a polymer formed by the constituent monomers ABC. In one particular embodiment, the polymer may have the structure ABCABCABC.... This structure may ensure that all three functional blocks are closely fixed together on the nanometer scale.

In one embodiment, the polymer is formed by combining the three monomers A, B and C in a known manner. Thus, the three monomers may be mixed and then polymerized in a suitable process, such as a step-growth polymerization process or a condensation reaction, to achieve proper ordering and spacing of the monomers relative to each other in a repeating monomer chain ABCABC.... In this embodiment, the compositions selected for each of the three monomers have at least two reactive end groups. Moreover, the polymer is a conjugated system to enable energy transfer at the molecular level from the light absorbing monomer C to the photocatalytic monomer B. The resulting polymer may then be applied to a substrate and cured. Alternatively, the resulting polymer may have sufficient structural integrity when cured so that a supporting substrate is not required. The polymer produced by this process will limit the spacing between monomers to the nanometer range, such as spacings of 0.3-10.0 nm.

The constituent or monomer B is adapted to bond a component of the atmospheric gas. Thus, in the constituent B may be adapted to bind carbon from atmospheric $CO_2$ in the presence of water to produce an alcohol output product, and in some cases $O_2$ as an additional output product. In one specific example, a polymer is formed from an amine group for monomer A, a Phthalocyanine dye for monomer C and a siloxane based photocatalyst for monomer B. A chemical structure for the resulting polymer is shown in FIG. 10. The reaction of the polymer to exposure to $CO_2$ and sunlight in the presence of water yields $CH_3OH$ (methanol) and $O_2$ as output products, as depicted in FIG. 11. Since the monomer spacing is on the nanometer scale, the photocatalyst monomer B is close to monomer A for access to the adsorbed $CO_2$ and to monomer C for efficient energy transfer from the absorbed sunlight. The conjugated system within the polymer further facilitates the transfer of energy from monomer C to monomer B.

The composition formed by the three constituents A, B, and C may be modified to adjust the absorption of water used as a reaction partner. Thus, a fourth composition or constituent D may be added that includes a hydrophilic group or a hydrophobic group as needed to obtain a well-defined affinity for water. For instance, when the base polymer of monomer B (the photocatalyst monomer) is generally hydrophobic, the fourth constituent D may be a monomer selected from a hydrophilic group to ensure that a sufficient amount of water is present at the polymer for an effective reaction. Suitable hydrophilic groups may include aliphatic groups. Likewise, when the base polymer is generally hydrophilic monomer D is selected from a hydrophobic group to avoid deactivation of the amine group (monomer A) by protonation due to excess water. Suitable hydrophobic groups may include methyl groups.

In a further embodiment, the photocatalyst element may incorporate a liquid-based catalyst. In this embodiment, each of the constituents or monomers is dissolved in a solution, such as an aqueous solution. In some cases, a monomer may require connection to a hydrophilic group in order to ensure solubility in the aqueous solution. For instance, a light enhancing monomer A, such as a Phthalocyanine dye, may require connection to a hydrophilic group, such as an aliphatic group. Similarly, the nano photocatalyst may require coupling to a hydrophilic group for solubility. In one aspect, the pH of the solution may be maintained in the alkaline region by adding a suitable buffer that is not reactive with the functional groups in the solution.

It is contemplated that $CO_2$ will be enriched in the solution as carbonate or bicarbonate ions. The monomers are provided in sufficiently high concentrations to ensure close spacing between the three functional monomers, preferably in the nanometer range.

In certain embodiments, a voltage may be applied to the photocatalytic element to overcome reaction barriers and boost the desired reaction and output product generation. In these embodiments, the photocatalytic monomer B may be adapted to operate as an electrode in an aqueous solution having a suitable electrical conductivity. A second chemical electrode is incorporated in the aqueous solution. The photocatalytic monomer is preferably connected to the negative pole of the voltage generator to facilitate the reduction of the $CO_2$. In this embodiment, a conductive photocatalyst element is desired, although a non-conductive photocatalyst element may be utilized if it is augmented with conductive materials, such as CNTs, graphenes, carbon black and the like.

It will be appreciated that the above described embodiments are merely exemplary, and that those of ordinary skill in the art may readily devise their own implementations and embodiments that incorporate the principles of the present invention and fall within the spirit and scope thereof. For instance, the photocatalytic elements of the embodiments disclosed herein are adapted to reduce $CO_2$ to useful output product(s). However, the photocatalytic elements may be adapted to reduce other atmospheric gases, such as deleterious greenhouse gases.

What is claimed is:

1. A photocatalytic composition, comprising in combination:
    a first constituent (A) capable of capturing or binding an atmospheric gas;
    a second constituent (B) capable of reducing the atmospheric gas using energy from sunlight; and
    a third constituent (C) adapted to absorb sunlight;
    wherein the second constituent is configured to reduce the atmospheric gas using energy from the sunlight absorbed by the third constituent.

2. The photocatalytic composition of claim 1, wherein said constituents are combined so that the spacing between constituents A and B, and between constituents B and C is on the nanometer scale.

3. The photocatalytic composition of claim 2, wherein said constituents are combined to permit electron energy transport between constituents B and C to transfer energy absorbed by constituent C to the constituent B.

4. The photocatalytic composition of claim 1, wherein said constituents are monomers combined into a single polymer.

5. The photocatalytic composition of claim 4, wherein said polymer is conjugated to allow energy transfer between at least monomer B and monomer C.

6. The photocatalytic composition of claim 5, wherein said monomers are combined in a repeating chain.

7. The photocatalytic composition of claim 6, wherein the repeating chain is monomer A, monomer B and monomer C.

8. The photocatalytic composition of claim 6, wherein the monomers are combined so that the spacing between adjacent monomers is on the nanometer scale.

9. The photocatalytic composition of claim 1, wherein atmospheric gas is carbon dioxide ($CO_2$).

10. The photocatalytic composition of claim 9, wherein the second constituent B is adapted to reduce the carbon in the $CO_2$, in the presence of water, to an alcohol.

11. The photocatalytic composition of claim 10, wherein the second constituent B is adapted to reduce the carbon to methanol.

12. The photocatalytic composition of claim 1, wherein constituent A is selected from an amine group.

13. The photocatalytic composition of claim 1, wherein constituent B includes a catalytic metal supported on an oxide.

14. The photocatalytic composition of claim 13, wherein the constituent B is siloxane based.

15. The photocatalytic composition of claim 1, wherein the constituent C is a dye adapted to absorb sunlight.

16. The photocatalytic composition of claim 15, wherein the constituent C is a phthalocyanine dye.

17. The photocatalytic composition of claim 1, further comprising a fourth constituent that is hydrophilic or hydrophobic.

18. The photocatalytic composition of claim 17, wherein:
    the fourth constituent is selected to be hydrophilic when the combination of constituents A, B and C is hydrophobic; and
    the fourth constituent is selected to be hydrophobic when the combination of constituents A, B and C is hydrophilic.

19. The photocatalytic composition of claim 17, wherein the fourth constituent is selected from the hydrophilic aliphatic group.

20. The photocatalytic composition of claim 17, wherein the fourth constituent is selected from the hydrophobic methyl group.

21. The photocatalytic composition of claim 1, wherein the constituents are dissolved in an aqueous solution.

22. The photocatalytic composition of claim 21, wherein the pH of the aqueous solution includes a buffer adapted to maintain the solution in the alkaline region.

23. A building panel comprising:
    a housing having a plurality of walls defining a chamber and an outlet in communication with said chamber, at least one wall having a portion that is transmissive to sunlight and at least one wall having including a portion permeable to an atmospheric gas; and a photocatalytic element disposed within said chamber for exposure to sunlight through said transmissive portion and operable to use sunlight to convert an atmospheric gas into an output product dischargeable through said outlet, wherein said photocatalytic element includes a composition including in combination;

a first constituent (A) capable of capturing or binding an atmospheric gas;

a second constituent (B) capable of reducing the atmospheric gas using energy from sunlight; and a third constituent (C) adapted to absorb sunlight.

24. The building panel of claim 23, wherein said constituents of said photocatalytic element are combined so that the spacing between constituents A and B, and between constituents B and C is on the nanometer scale.

25. The building panel of claim 23, wherein said constituents of said photocatalytic element are combined to permit electron energy transport between constituents B and C to transfer energy absorbed by constituent C to the constituent B.

26. The building panel of claim 23, wherein said constituents are monomers combined into a single polymer.

27. The building panel of claim 26, wherein said monomers are combined in a repeating chain.

28. The building panel of claim 27, wherein the repeating chain is monomer A, monomer B and monomer C.

29. The building panel of claim 23, wherein the atmospheric gas is carbon dioxide ($CO_2$).

30. The building panel of claim 29, wherein the second constituent B is adapted to reduce the carbon in the $CO_2$, in the presence of water, to an alcohol.

31. The building panel of claim 30, wherein the second constituent B is adapted to reduce the carbon to methanol.

32. The building panel of claim 23, wherein constituent A is selected from an amine group.

33. The building panel of claim 23, wherein constituent B includes a catalytic metal supported on an oxide.

34. The building panel of claim 33, wherein the constituent B is siloxane based.

35. The building panel of claim 23, wherein the constituent C is a dye adapted to absorb sunlight.

36. The building panel of claim 35, wherein the constituent C is a phthalocyanine dye.

37. The building panel of claim 23, further said photocatalytic element further includes a fourth constituent that is selected to be hydrophilic when the combination of constituents A, B and C is hydrophobic, and is selected to be hydrophobic when the combination of constituents A, B and C is hydrophilic.

38. The building panel of claim 23, wherein the constituents are dissolved in an aqueous solution.

39. The building panel of claim 38, wherein the pH of the aqueous solution includes a buffer adapted to maintain the solution in the alkaline region.

40. The building panel of claim 39, wherein the pH of the aqueous solution includes a buffer adapted to maintain the solution in the alkaline region.

* * * * *